United States Patent [19]

Kalwara et al.

[11] Patent Number: 5,520,761
[45] Date of Patent: May 28, 1996

[54] ROOFING SEAM INSTALLATION PROCESS

[75] Inventors: Joseph J. Kalwara, Indianapolis; Daniel L. Barksdale; James L. Hoff, both of Brownsburg, all of Ind.

[73] Assignee: Bridgestone/Firestone, Inc., Akron, Ohio

[21] Appl. No.: 129,226

[22] Filed: Sep. 29, 1993

[51] Int. Cl.$^6$ .................................................. B32B 31/12
[52] U.S. Cl. ........................... 156/157; 156/71; 156/281
[58] Field of Search .......................... 156/71, 157, 281, 156/309.3, 306.6, 307.3; 428/57, 141; 52/745.21, 746

[56] References Cited

U.S. PATENT DOCUMENTS

| | | | |
|---|---|---|---|
| 3,755,066 | 8/1973 | Rose | 428/462 |
| 4,281,037 | 7/1981 | Choung | 428/470 |
| 4,437,283 | 3/1984 | Benoit . | |
| 4,450,252 | 5/1984 | Fieldhouse . | |
| 4,480,012 | 10/1984 | Fieldhouse . | |
| 4,501,842 | 2/1985 | Chmiel et al. . | |
| 4,588,637 | 5/1986 | Chiu | 428/521 |
| 4,589,804 | 5/1986 | Paeglis et al. . | |
| 4,601,935 | 7/1986 | Metcalf et al. | 428/57 |
| 4,767,653 | 8/1988 | Renstrom . | |
| 4,849,268 | 7/1989 | Backenstow et al. . | |
| 4,855,172 | 8/1989 | Chiu | 156/71 |
| 4,885,887 | 12/1989 | Simmons et al. . | |
| 4,897,137 | 1/1990 | Miller | 156/157 |
| 4,897,293 | 1/1990 | Thessen . | |
| 4,936,071 | 6/1990 | Karrfalt . | |
| 5,084,119 | 1/1992 | Barksdale . | |
| 5,204,148 | 4/1993 | Alexander et al. . | |
| 5,331,784 | 7/1994 | Agrawal | 156/108 |
| 5,447,006 | 9/1995 | Zenor | 156/94 |

OTHER PUBLICATIONS

Material Safety Data Sheet for TS3320-19® from Lord® Chemical Products, Sep. 11, 1985.
Material Safety Data Sheet for TS3320-19® from Lord® Chemical Products, Mar. 9, 1994.
Product Information Sheet for Chemlok® TS3320-19® from Lord® Elastomer Products, 1992.

*Primary Examiner*—Daniel J. Stemmer
*Attorney, Agent, or Firm*—Frank J. Troy, Sr.

[57] ABSTRACT

A process for preparing a lap seam for roofing comprising applying a butyl rubber-containing primer with a mesh pad to the EPDM membrane surfaces to be joined, the primer having an elastomeric solids content of from about 15–20 percent, by weight. Thereafter positioning a splice tape between the primed surfaces to form a seam structure and applying pressure to the structure thus provided to form an adhesively-held lap seam characterized by being water tight and having superior peel strength.

19 Claims, 1 Drawing Sheet

ROOFING SEAM INSTALLATION PROCESS

TECHNICAL FIELD

This invention relates to water-proof roofing systems fabricated with elastomeric membranes. More particularly, this invention relates to an improved method for preparing lap seams for rubber membranes that are less vulnerable to penetration by water with which the seams come in contact as a result of their exposure to the elements, and from other sources. Specifically, this invention relates to EPDM membranes joined by lap seams in which the seaming system includes primers having a relatively high elastomeric solids content which are applied to the membrane by mesh pads, and which employs adhesive seam tapes to obtain water-proof seals throughout the seam joint.

BACKGROUND OF THE INVENTION

The use of roofing systems capable of successfully maintaining their integrity, particularly their ability to prevent the entry of water resulting from their exposure to rain, snow and from other causes is a fundamental requirement for any successful building structure, particularly roofing decks employed in connection with flat or low-slope roofs installed on commercial, institutional and industrial buildings.

In the past, a variety of roofing systems have been used in connection with such buildings including, for example, metal panel roofing. Such roofing usually consists of metal panels overlapped at their ends and secured to the roofing decks of building structures with nails, screws, clips or other fasteners. However, while metal panels are relatively durable, the panels are subject to significant thermally induced contractions and expansions due to ambient temperature variations, a characteristic that often leads to the cracking of such roofing, especially along the roof seams and fastener locations, with leakage occurring as a result thereof.

Another type of roofing commonly employed for such buildings is the so-called built-up roofing system. The latter type of roofing depends upon the application of asphaltic compounds to secure felt or other membranes to metal roof panels. While such systems are often used, they can be relatively expensive to provide, and again thermal contraction and expansion of the metal panels over which they are installed can result in cracking of the roof covering along its seams and fastener locations, resulting in roof leakage.

The latter type of roofing also undesirably increases the weight of the roofing surface, which can add unwanted stresses to buildings on which such roofing is installed, and in addition, the use of hot asphalt is sometimes prohibited by local building codes. Finally, built-up roofing systems typically eventually require retrofit roofing installations, and these can be difficult to provide in view of the fact that they sometimes necessitate the provision of intermediate foundation layers, such added layers creating further roofing support problems. In fact, not uncommonly, these retrofit installations can result in the shifting of the roofing deck itself, movement which causes still more cracks and further leakage.

In order to overcome the foregoing and other problems associated with such roofs, resort has increasingly been had to the use of roofing membranes formed from ethylene/propylene/non-conjugated diene rubber, EPDM, membranes. In this regard, EPDM membranes have proven to be admirably suited for roofing systems since they have a long life, substantial flexibility and retain their resiliency at very low temperatures. They are also distinguished by their ability to withstand the high temperatures frequently encountered in roofing environments without stretching or softening unduly, and by their possession of a high order of resistance to ultraviolet light. EPDM elastomers are usually blended with fillers, coloring agents, extenders, crosslinking agents and antioxidants to form compounded rubbers that are then calendared or extruded into sheets or membranes, typically about 7 to 40 feet wide, and 100 or more feet long.

In many roofing installation situations in which such membrane sheets are employed, however, it becomes necessary to overlap a number of the sheets in water-tight splices to obtain the required coverage. In one such splicing system, the procedure involves thoroughly cleaning the surface of the membranes to be joined in an overlap seam. Such cleaning is required in order to remove the talc or mica dusting used by manufacturers to keep the membrane surfaces from sticking together in the rolls in which they are marketed. Cleaning is typically done by vigorously scrubbing the surface to be joined with a rag wetted with hexane, naphtha, gasoline or some other similar material. Thereafter, a membrane adhesive, commonly consisting of a 25–30 percent, by weight, solution of rubber in a suitable solvent is brushed over the surfaces to be adhered, and following drying of the contained solvent, the surfaces are joined and pressed together to form the desired seam. In some instances, a "primer" consisting of a dilute solution of rubber in a suitable solvent is applied to the surfaces to be joined prior to application of the membrane adhesive in order to improve the final seam adhesion. Thereafter, a caulk is often added to the overlapped edges of the seam in order to protect the adhesive.

While the system described is conceptually simple, in practice, it suffers from being both labor and material intensive, and it also results in relatively low seam peel strengths. Furthermore, for environmental and health reasons, it is undesirable, and increasingly unlawful, to use a system that employs so much volatile organic compound, VOC, in the form of required components.

Partially to reduce the amount of VOC's, as well as to improve seam strengths, an alternative system has relied upon so-called seam tapes to obtain the necessary adhesion. Seam tapes, as the name implies, are sticky strips of adhesives commonly formed from butyl or other rubbers, which are compounded to include rubber tackifiers and other agents required to impart adhesive qualities.

The seaming process entails the initial cleaning of the surfaces to be joined with a liquid organic cleaner-impregnated rag to remove anti-stick dusting powders. Following such cleaning, a dilute seam primer containing from about 5 to 9 percent by weight of rubber in a solvent therefor, is applied to the membrane seam overlap surfaces, and following drying, the coated surfaces are mated and pressure is applied to the seam to secure the necessary joinder.

While the use of seam tape eliminates the VOC's which would otherwise be present as a consequence of the solvents in seam adhesives, the need to clean the surfaces with liquid organics, and the relatively large amount of solvents present in the very dilute primer make the escape of large amounts of VOC's to the atmosphere unavoidable. In addition, the need to perform both a cleaning process, as well as a priming operation, necessarily results in relatively high installation costs as a result of the additional labor and material required.

In view of the foregoing, therefore, it is a first aspect of this invention to provide a process for installing membrane roofing seams that eliminates any need to perform a separate cleaning step.

A second aspect of this invention is to provide a process for installing seams in membrane roofing systems using seam tapes that utilize primers containing lower amounts of volatile organic compound materials.

A further aspect of this invention is to provide roofing seam primers whose application to the roofing membranes obviates the needs to initially clean the surfaces to be joined.

An additional aspect of this invention is to provide roofing primers whose application to roofing membranes also serves to clean the areas of membranes to be joined.

Another aspect of this invention is to reduce the amount of volatile organic compound materials that are available to enter the atmosphere.

Yet a further aspect of this invention is to provide roofing seam primers and a method for their application that increases the peel strengths of membrane roofing seams prepared therewith.

Still another aspect of this invention is to provide a method for installing seams in membrane roofing systems that reduces installation costs, as well as the amount of fill material needed for low areas, step-offs, etc., to provide a smooth surface for receiving seam tape.

BRIEF DESCRIPTION OF THE INVENTION

The preceding and other aspects of the invention are provided by a process for preparing seams joining adjacent membrane roofing sheets together, the seams being formed by the joinder of a portion of the upper surface of one of the sheets to a portion of the lower surface of the other sheet. In the process, a mesh pad is used to prime both such surfaces with a primer comprising a butyl rubber-containing material dissolved in a hydrocarbon solvent, the primer containing from about 15 to 20 percent by weight of elastomeric solids. A splice tape comprising a strip of rubber that includes rubber tackifiers is then placed on the primed upper surface, following which the primed lower surface of the other sheet is placed on the top of the tape to form the desired splice.

The preceding and additional aspects of the invention are provided by a liquid primer material for preparing seams in membrane roofing systems employing seam tapes comprising a butyl rubber-containing elastomer; a polyisocyanate-containing curing agent; and a hydrocarbon solvent for the polymeric material and the curing agent. The primer material contains from about 15–20 percent, by weight, of elastomeric solids.

The preceding and further aspects of the invention are provided by an EPDM membrane roof installed according to the process of the penultimate paragraph.

BRIEF DESCRIPTION OF THE DRAWINGS

The invention will be better understood when reference is had to the following figures, in which like-numbers refer to like-parts, and in which.

DETAILED DESCRIPTION OF THE INVENTION

Figure 1:
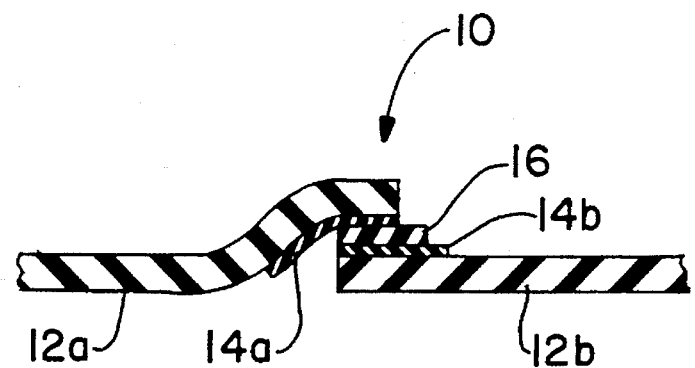
FIG. 1 is a side elevation of a roofing membrane sheet lap seam.

Sheets of EPDM roofing membrane are often prepared by a double calendaring process in which two sheets of uncured material are pressed together by rollers to form a single sheet, the composite single sheet then being coated with talc or mica to prevent contacting surfaces from sticking together, wound into a roll and cured. At the site of the roofing installation, the membrane is unrolled and joined, for example, by lap seaming, the seaming method with which this invention is concerned.

In any of the several ways of preparing EPDM roofing seams, it is necessary that the talc or mica antistick agents be removed from the membrane surface prior to applying whatever adhesive system is to be used to join adjacent membrane sheets together. If the removal process is not thorough, the particles of talc or of mica, as the case may be, prevent the adhesive material employed from thoroughly coating the surface area covered by the anti-stick agent. This results in inferior adhesion, subsequent de-coupling of the joint, and eventual penetration of water through the seam.

In order to avoid this result, and as previously mentioned, the practice of the prior art is to clean the areas of the membrane sheets which are to be joined in a seam with a cloth wetted with some suitable organic cleaning material, a joining adhesive being applied thereafter. It has now been discovered, however, that the anti-stick agents may be removed and the joinder adhesive applied simultaneously through employment of a primer having a high elastomeric solids content, used in conjunction with a mesh pad applicator. The application process entails saturating the mesh pad with the primer, for example by dipping it in the primer, and applying the saturated pad to the surfaces to be joined. The contact of the mesh pad with the membrane surface scrubs and scours the surface during the coating process, dislodging the anti-stick agent which is then caught-up and suspended in the primer-saturated pad, leaving the newly cleaned surface coated with the primer.

It has been determined, however, to be important that the primer used with the pad have a high elastomeric solids content since the more dilute primers lack the ability to suspend the anti-stick agents in an entrapped condition within the pad. Furthermore, pick-up of the primer in the mesh pad to a satisfactory degree during the dipping process is difficult to achieve with dilute primer solutions. Conversely, if the primer has too high an elastomeric solids content, it is too thick to properly pick-up and suspend the talc or mica coating. In addition, it is difficult for the pad to become properly saturated if dipped in primers that are too thick, i.e., those containing too high an elastomeric solids content.

When the primer contains the correct amount of elastomeric solids, however, and as will be explained in more detail in the following, the saturated pad scrubs the surface to be seamed, dislodging the anti-stick agents and entrapping them in the mesh, and simultaneously leaves a satisfactory coating of adhesive on the membrane surface.

FIG. 1 is a side elevation of a roofing membrane sheet lap seam, generally 10. As shown in the Figure, two adjacent membrane sheets, 12a and 12b, are connected in an overlapping joinder seam. The upper surface of membrane 12b is coated with a layer of primer 14b, while membrane 12a is similarly coated with a layer of primer 14a. Interposed between the primer layers 14a and 14b is a splice tape 16. While equivalent methods may be employed, the following illustrates installation of the seam.

Two sheets are placed in an adjacent relationship, the edges overlapping by the desired seam amount, for example, from about 3 to 5 inches. A portion of the upper sheet is then folded back over itself and temporarily held in that position, for instance, by the application of primer to form "tacking points" every 4 to 6 feet along the seam. The fold-back area will typically be about 1 foot wide. Primer having the proper elastomeric solids content, as described hereinafter, is then poured into a pail or bucket and the mesh pad is dipped therein and held horizontally so that no primer drips out prematurely as the pad is removed therefrom. The primer is applied to the lower surface of the folded back membrane, and to the upper surface of the other membrane, using long back-and-forth strokes with moderate to heavy pressure along the length of the splice area until the surfaces have acquired a coating of primer, with no apparent streaking or puddling. A deposit of primer from about 3 to 5 mils thick, for example, will give satisfactory adhesion. Fresh scrubbing pads are substituted for previously used pads about every 200 feet of application, or when the primer has dried, leaving the pad compressed.

The primer is thereafter allowed to dry completely, usually requiring a period of less than 10 minutes, after which a strip of splice tape is applied to the primed upper surface of the membrane forming the lower portion of the seam. The splice tape, which is typically furnished in a roll as a laminate comprising the tape itself and a layer of release paper, is positioned with the release paper facing upwardly. Pressure is then applied, for example, by a roller to the release paper surface of the tape, firmly bonding the primed surface of the lower membrane to the exposed lower surface of the tape. Thereafter, the top membrane is untacked, allowing it to fall over the release paper on the tape, but with a portion of the release paper extending visibly past the seam edge. The release paper is then pulled outwardly, away from the seam, thereby bringing the primed surface of the upper membrane into direct contact with the now exposed upper surface of the release tape.

Finally, pressure is applied to the upper membrane along the entire seam area, conveniently with a roller, to achieve a finished seam.

Primers of the invention comprise a butyl rubber-containing polymer base, together with a curing system, the two being dissolved in a suitable solvent. The primers may also advantageously contain a small amount of a pigment such as carbon black to make them readily visible when coated on membrane surfaces and to differentiate them from other roofing adhesives.

Butyl rubbers comprising copolymers of isobutylene and isoprene can, for example, have an unsaturation of from about 0.6 to 2.5 mole percent. The rubbers will usually have a raw Mooney viscosity of ML 1+8 at 212° F. of from about 18 to 75. Brominated and chlorinated butyls are also suitable for purposes of the invention, and in this regard, they may contain from about 1 to about 1.5 weight percent of bromine or chlorine. Mixtures of the preceding, which may include some uncured rubber, can also be satisfactorily employed.

In order to develop the necessary physical properties in cases where the primer mixture contains uncured rubber, a curing agent is provided in the primer which has the ability to promote substantial curing of the uncured rubber within a matter of hours under typical ambient roofing conditions. In this connection, and although other cure systems might be employed, in a preferred embodiment it has been found desirable to incorporate diisocyanate curing systems in amounts of from about 0.2–0.5 percent, on a weight basis, in the primer mixture. Also, in a preferred embodiment, it has been found desirable to employ oligomers of alkyl diisocyanates in the primer, particularly trimers of 1,4-hexane diisocyanate. Such curing systems react with the water adventitiously present to form amines which subsequently interact with the butyl rubber polymer system. Irrespective of the nature of the curing system, however, it should be soluble in the primer mixture.

The solvents in which the butyl rubber and curing agents are dissolved may include any of a number of organic solvents, for example heptane, toluene, xylene, as well as mixtures thereof.

In order to serve as a suspending agent for the talc and/or mica anti-stick agents, and as previously described, it is necessary that the primer have a total elastomeric solids content within a particular range. In this regard, the elastomeric solids content of the primer, on a weight basis, should be between 15 to 20 percent, more advantageously between about 15 to 16 percent, by weight.

A typical primer composition might, for instance, contains the following materials in the amounts shown.

| Component | Amount (By Weight) |
| --- | --- |
| Butyl Rubber Base Polymer | Approx. 16% |
| Polyisocyanate Trimer | 0.5% |
| Heptane | 45.4% |
| Toluene | 35.6% |
| Xylene | 2.9% |

Figure 2:
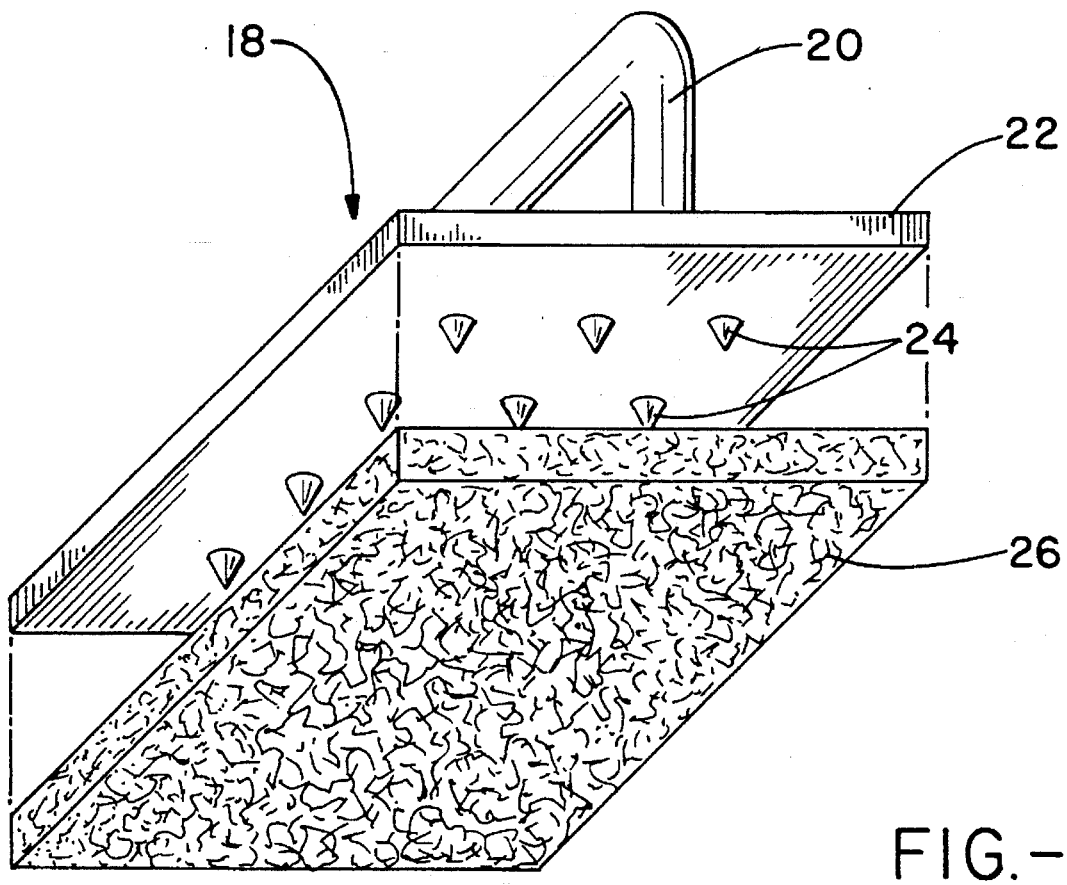
FIG. 2 is an exploded isometric view of a mesh primer applicator pad and a holder therefore.

The mesh pads suitable for purposes of the invention may conveniently take the form of that of FIG. 2, which shows an exploded isometric view of a mesh primer applicator pad and a holder therefore. As shown in the Figure, the mesh pad 26 can be secured to an applicator, generally 18, by being impaled on retaining cleats 24, which are fastened or molded to the underside of applicator base plate 22. The applicator 18 is held and manipulated by grasping handle 20, attached to base plate 22. After a pad has become ineffective for any of the reasons previously described, it is simply lifted from the cleats and a new pad installed thereon.

The mesh pads contemplated by the invention may comprise any pad having a mesh formed from woven or non-woven filamentary material, for example, cellulosic or plastic materials. A suitable pad for purposes of the invention, for instance, is "Scotch Bright general purpose, hand pad no. 7447," marketed by the 3-M Company, although other equivalent products may also be used. The Scotch Bright pads are typically formed from non-woven synthetic fibers to which an abrasive mineral is bonded by means of a polymer adhesive to form a web that is tough, open, chemically resistant, conformable and long lasting. When such pads are made from a plastic, for example, from nylon, they resist tearing, splintering and shredding.

Splice tape of the type useful for purposes of the invention comprises a tape strip, commonly about 2–4 inches wide, and from about 25 to 50 mils thick. One side of the tape is covered by release paper of the type well-known in the art to keep adjacent surfaces of the tape from sticking to each other. The tapes include rubbers such as butyl rubber and contain tackifiers to enhance their tackiness. Such tapes are taught, for example, in U.S. Pat. Nos. 4,426,468; 4,539,344; 4,588,637 and 4,855,172, the teachings of which are incorporated herein by references.

While seams of the type described herein may be used in conjunction with any rubber membrane with which the primers of the invention form adhesive bonds, the invention is particularly useful in conjunction with roofing made from EPDM membranes, and when so used it provides seam bonds markedly superior to those of the prior art, as is evident from the following table. The values shown in the Table reflect testing by the method of ASTM D-1876 after the seam samples tested were exposed to hot and cold cycling in accordance with the Rubber Manufacturers' Association procedure RP-10, "Minimum Peel Strength Requirements For Adhesives Used In Seaming Black EPDM Sheets," which procedure is incorporated by reference herein. Tests 1 and 2 describe peel strengths of seams prepared according to the prior art in which EPDM membranes are coated with a primer containing 9 percent, by weight, of elastomeric solids applied with a rag. The last two tests, 3 and 4 respectively, describe peel strength values in which, however, a primer containing 15 percent, by weight, of elastomeric solids was applied using an open mesh pad. The standard EPDM samples differed from those identified as being reinforced in that the latter incorporated scrim reinforcement in the membranes.

| Test | Sample Type | Peel Strength (lbs./inch) |
|---|---|---|
| 1 | Standard | 7.6 |
| 2 | Reinforced | 7.5 |
| 3 | Standard | 12.1 |
| 4 | Reinforced | 16.0 |

The preceding tests in which the systems tested are comparable except for the elastomer solids content of the primer, and its method of application, clearly demonstrate the superior seam strengths that can be obtained using the method of the invention.

The membranes seamed by the method of the invention can be fastened to roofs over which they are positioned by any of the well-known systems, for example, by contact adhesives, with battens and/or screws, with ballasting or in other ways.

While in accordance with the patent statutes, a preferred embodiment and best mode has been presented herein, the scope of the invention is not limited thereto, but rather is measured by the scope of the attached claims.

What is claimed is:

1. A process for preparing seams joining adjacent membrane roofing sheets having upper and lower joinder surfaces including anti-stick agents, said process comprising:

in a single step, priming and cleaning said upper joinder surface and removing said anti-stick agents by scouring said upper joinder surface with an applicator wetted with a primer so that the anti-stick agents are taken up by the applicator, said primer comprising one or more butyl rubber-containing polymer dissolved in a hydrocarbon solvent and including from between 15 and 20 percent by weight of elastomeric solids, and in a corresponding single step priming and cleaning said lower joinder surface and removing said anti-stick agents by scouring said lower joinder surface with an applicator wetted with said primer so that the anti-stick agents are taken up by the applicator;

placing splice tape on top of said primed lower joinder surface, said splice tape comprising a strip of rubber containing rubber tackifiers; and placing said primed upper joinder surface on top of said tape to form a splice in which said primer and said splice tape securely hold said adjacent roofing sheets together.

2. A process according to claim 1, in which said primer includes a cure system comprising a polyisocyanate.

3. A process according to claim 2, in which said polyisocyanate is formed from 1,4-hexane diisocyanate and is soluble in said primer.

4. A process according to claim 3, in which said polyisocyanate is a polyisocyanate trimer.

5. A process according to claim 1, in which said solvent is a mixture of heptane, toluene and xylene.

6. A process according to claim 1, in which said step of applying roofing primer is achieved using a mesh pad which comprises a web of non-woven plastic filamentary material impregnated with abrasive particles, said web being fabricated in the shape of a three-dimensional pad.

7. The process of claim 1, in which said membrane roofing sheets are fabricated from elastomeric terpolymers prepared from an ethylene/propylene/non-conjugated diene monomer.

8. A process according to claim 1, in which said applicator comprises a mesh pad.

9. A process according to claim 8, in which said pad is a woven or non-woven mesh pad of synthetic fibers.

10. A process according to claim 9, wherein the pas is saturated.

11. A process according to claim 9, in which said pad is saturated with said primer and said anti-stick agents are entrapped and taken-up by said pad during said priming and cleaning step.

12. A process according to claim 9, wherein said applicator includes handle means, said handle means comprising a base plate having pad-retaining means and a grasping handle.

13. A process according to claim 12, wherein said pad retaining means comprises cleats.

14. A process for preparing seams joining adjacent membrane roofing sheets having upper and lower joinder surfaces, said process comprising:

priming said upper joinder surface by scrubbing said upper joinder surface with an applicator comprising synthetic fibers bonded to an abrasive material, and handle means, said applicator being wetted with a primer, said primer comprising one or more butyl rubber-containing polymer dissolved in a solvent and including from about 15 and up to 20 percent by weight of elastomeric solids, and in a corresponding step priming said lower joinder surface by scrubbing said lower joinder surfaces with said applicator wetted with said primer;

placing splice tape on top of said primed lower joinder surface, said splice tape comprising a strip of rubber containing rubber tackifiers; and placing said primed upper joinder surface on top of said tape to form a splice in which said primer and said splice tape securely hold said adjacent roofing sheets together.

15. A process according to claim 1, wherein said applicator comprises a woven or non-woven mesh pad.

16. A process according to claim 14, wherein the pad is saturated.

17. A process according to claim 14, wherein said handle means compromises a base plate having pad-retaining means and a grasping handle.

18. A process according to claim 14, wherein said pad retaining means comprises cleats.

19. A process for preparing seams joining adjacent membrane roofing sheets having upper and lower joinder surfaces including anti-stick agents, said process comprising:

in a single step, priming and cleaning said upper joinder surface and removing said anti-stick agents by scouring said upper joinder surface with an applicator wetted with a primer so that the anti-stick agents are taken up by the applicator, said primer including from about 15 up to 20 percent by weight of one or more butyl rubber-containing polymer selected from the group consisting of copolymers of isobutylene and isoprene, brominated butyl rubber, chlorinated butyl rubber, and mixtures of brominate and chlorinated butyl rubbers, dissolved in a solvent, and in a corresponding single step priming and cleaning said lower joinder surface and removing said anti-stick agent surfaces by scouring said lower joinder surface with an applicator wetted with said primer so that the anti-stick agents are taken up by the applicator;

placing splice tape on top of said primed lower joinder surface, said splice tape comprising a strip of rubber containing rubber tackifiers; and placing said primed upper joinder surface on top of said tape to form a splice in which said primer and said splice tape securely hold said adjacent roofing sheets together.

\* \* \* \* \*